US010250541B2

(12) United States Patent
Beach et al.

(10) Patent No.: US 10,250,541 B2
(45) Date of Patent: Apr. 2, 2019

(54) PREDICTIVE RESPONSES TO INCOMING COMMUNICATIONS

(71) Applicant: Google Inc., Mountain View, CA (US)

(72) Inventors: Nathan Dickerson Beach, Cambridge, MA (US); Daniel George Koulomzin, Jamaica Plain, MA (US)

(73) Assignee: Google LLC, Mountain View, CA (US)

( * ) Notice: Subject to any disclaimer, the term of this patent is extended or adjusted under 35 U.S.C. 154(b) by 299 days.

(21) Appl. No.: 15/015,075

(22) Filed: Feb. 3, 2016

(65) Prior Publication Data
US 2017/0222961 A1  Aug. 3, 2017

(51) Int. Cl.
H04L 12/58 (2006.01)

(52) U.S. Cl.
CPC .............. *H04L 51/16* (2013.01); *H04L 51/02* (2013.01); *H04L 51/24* (2013.01); *H04L 51/046* (2013.01); *H04L 51/063* (2013.01)

(58) Field of Classification Search
CPC ........................................ H04L 51/26
USPC ........................................ 709/206
See application file for complete search history.

(56) References Cited

U.S. PATENT DOCUMENTS

| | | | |
|---|---|---|---|
| 7,209,951 B2 | 4/2007 | Goldberg | |
| 7,660,855 B2 | 2/2010 | Arning et al. | |
| 8,996,639 B1 | 3/2015 | Faaborg et al. | |
| 2002/0059164 A1* | 5/2002 | Shtivelman | ....... G06F 17/30722 |
| 2005/0108345 A1 | 5/2005 | Suzuki | |
| 2005/0135681 A1 | 6/2005 | Schirmer | |
| 2006/0190830 A1 | 8/2006 | Gerstl et al. | |
| 2009/0254624 A1 | 10/2009 | Baudin et al. | |
| 2009/0282114 A1 | 11/2009 | Feng et al. | |
| 2015/0033143 A1* | 1/2015 | Lee | .......... H04L 51/16 715/752 |

(Continued)

FOREIGN PATENT DOCUMENTS

EP  2393046 A1  12/2011

OTHER PUBLICATIONS

Bell, "Gmail can use Google's AI to write replies for you", May 17, 2017. Mashable. Retrieved from the Internet: <http://mashable.com/2017/05/17/gmail-smart-replies/#5Xpn25v8YOqK> 6 pp.

(Continued)

*Primary Examiner* — David R Lazaro
*Assistant Examiner* — Zia Khurshid
(74) *Attorney, Agent, or Firm* — Shumaker & Sieffert, P.A.

(57) ABSTRACT

A computing system includes a communication unit configured to receive a plurality of message histories, at least one processor, and at least one module. The at least one module is operable by the at least one processor to: determine, based on the plurality of message histories, a plurality of message and response pairs, determine a number of instances of each response for each message from the plurality of message and response pairs, classify each response from the plurality of message and response pairs as having an information type, and store an indication of each unique message from the plurality of message and response pairs, an indication of the information type associated with the respective response associated with the unique message, and a number of responses from the plurality of message and response pairs having the information type.

17 Claims, 5 Drawing Sheets

(56) References Cited

U.S. PATENT DOCUMENTS

2015/0089007 A1* 3/2015 Amoroso ............. G06Q 10/107
                                                                                          709/206

OTHER PUBLICATIONS

International Search Report and Written Opinion of International Application No. PCT/US2016/068458, dated Mar. 9, 2017, 13 pp.

* cited by examiner

| Message | Response |
|---|---|
| are you coming | on my way |
| when works for you | 6pm |
| congratulations, jon | thank you |

70

| Message | Response | Number of responses |
|---|---|---|
| when works for you | 6pm | 103 |
| when works for you | now | 78 |
| when works for you | 7am | 61 |
| when works for you | thanks so much david | 1 |

72

| Message | Response Type | Number of responses |
|---|---|---|
| when works for you | TIME | 103 |
| when works for you | UNKNOWN | 78 |
| when works for you | TIME | 61 |
| when works for you | UNKNOWN | 1 |

74

| Message | Response Type | Number of responses |
|---|---|---|
| when works for you | TIME | 164 |
| when works for you | UNKNOWN | 79 |

PREDICTIVE RESPONSES TO INCOMING COMMUNICATIONS

BACKGROUND

Computing devices (e.g., mobile phones, tablet computers, etc.) may enable a user to respond to incoming communications from one or more other computing devices. In some cases, the incoming communications (e.g., an email, a text message, a meeting request, etc.) may include textual information. A computing device may enable a user of the computing device to respond to the incoming communication by allowing the user to input textual information (e.g., using an input device), and send the textual information to the one or more other computing devices as a response.

Some computing devices may enable a user to choose a response stored by the computing device and send the chosen stored response, such as by providing one or more options that the user may select. For example, responsive to receiving a meeting request, a computing device may enable a user of the computing device to select a response to "accept" the meeting request, "decline" the meeting request, or choose other stored options. However, the computing device may provide only a small number of stored responses, thereby reducing the likelihood that the available stored responses include a response desired by the user. Conversely, the computing device may provide a larger number of stored responses, thereby requiring the user to search through a number of responses, which may not be useful in the current context of the incoming communication.

SUMMARY

In one example, a method may include receiving, by a computing system, a plurality of message histories, wherein each message history from the plurality of message histories includes one or more of a simple messaging service message history, multimedia messaging service message history, an instant messaging message history, or an email message history, determining, by the computing system and based on the plurality of message histories, a plurality of message and response pairs, determining, by the computing system, a number of instances of each response for each message from the plurality of message and response pairs. The method may also include classifying, by the computing system, each response from the plurality of message and response pairs as having an information type, and storing, by the computing system, an indication of each unique message from the plurality of message and response pairs, an indication of the information type associated with the respective response associated with the unique message, and a number of responses from the plurality of message and response pairs having the information type In another example, a computing system includes at least one communication unit, a storage device, at least one processor, and at least one module. The at least one communication unit is configured to receive a plurality of message histories, wherein each message history from the plurality of message histories includes one or more of a simple messaging service message history, multimedia messaging service message history, an instant messaging message history, or an email message history. The at least one module is operable by the at least one processor to determine, based on the plurality of message histories, a plurality of message and response pairs, determine a number of instances of each response for each message from the plurality of message and response pairs, classify each response from the plurality of message and response pairs as having an information type, and store, at the storage device, an indication of each unique message from the plurality of message and response pairs, an indication of the information type associated with the respective response associated with the unique message, and a number of responses from the plurality of message and response pairs having the information type.

In another example, a computer-readable storage device is encoded with instructions that, when executed, cause at least one processor of a computing system to receive a plurality of message histories, wherein each message history from the plurality of message histories includes one or more of a simple messaging service message history, multimedia messaging service message history, an instant messaging message history, or an email message history, determine, based on the plurality of message histories, a plurality of message and response pairs, and determine a number of instances of each response for each message from the plurality of message and response pairs. The instructions may further cause the one or more processors to classify each response from the plurality of message and response pairs as having an information type, and store an indication of each unique message from the plurality of message and response pairs, an indication of the information type associated with the respective response associated with the unique message, and a number of responses from the plurality of message and response pairs having the information type.

The details of one or more examples are set forth in the accompanying drawings and the description below. Other features, objects, and advantages will be apparent from the description and drawings, and from the claims.

BRIEF DESCRIPTION OF DRAWINGS

FIG. 3 is a conceptual diagram illustrating example data generated while classifying responses, in accordance with one or more aspects of the present disclosure.

DETAILED DESCRIPTION

Figure 1:
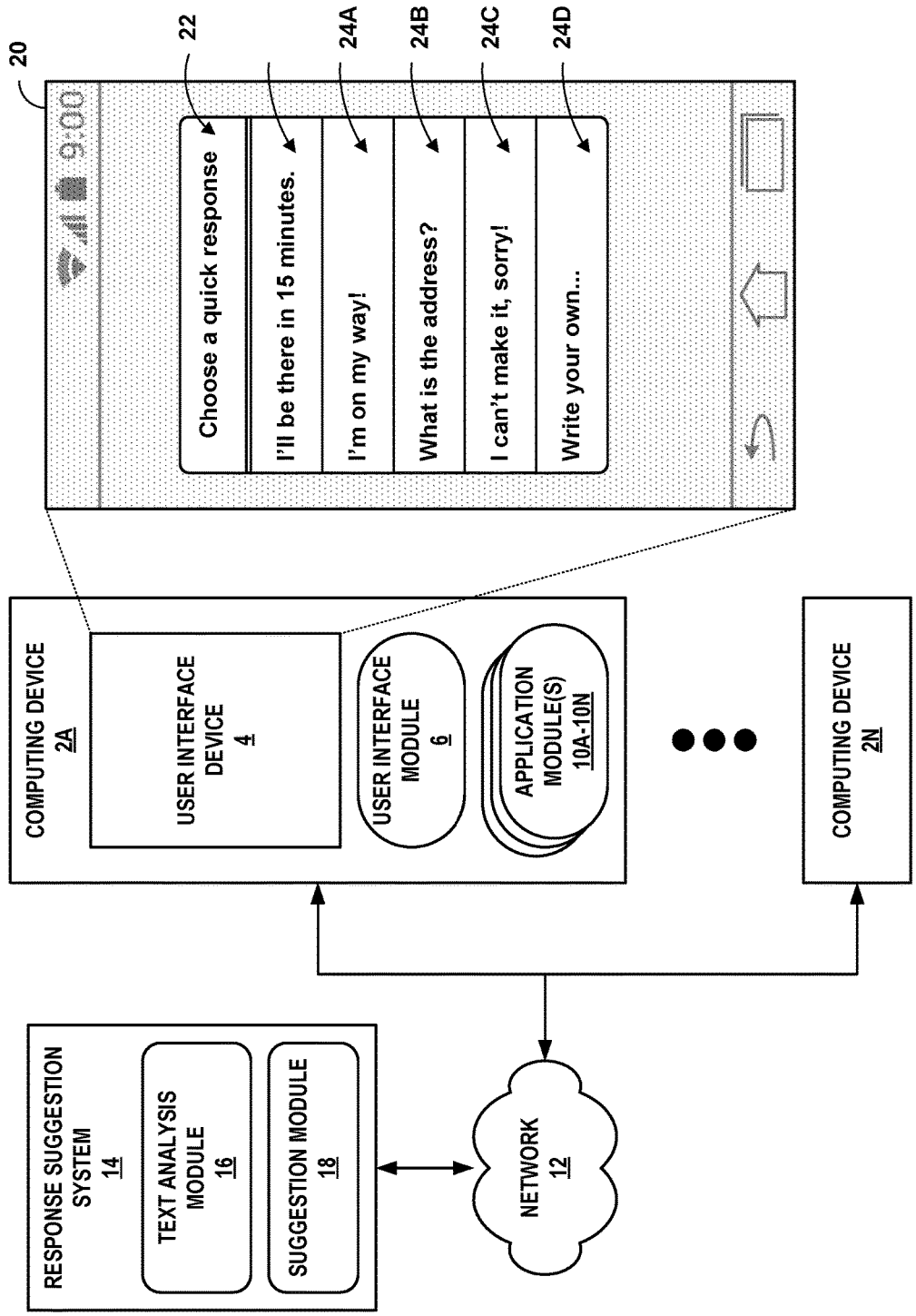
FIG. 1 is a conceptual diagram illustrating an example computing environment and graphical user interface (GUI) for providing candidate responses to an incoming communication, in accordance with one or more aspects of the present disclosure.

In general, techniques of this disclosure may enable a computing system to provide a computing device with candidate responses to incoming communications. The candidate responses may be relevant to the incoming communication and/or to a current situation (e.g., a current context) of a user of the computing device and/or of the computing device. The computing system may determine which candidate responses to send to the computing device based at least in part on the frequency with which users (e.g., the user of the computing device and/or other users) have previously selected the responses to respond to the same or similar incoming communications. For example, a computing system may receive an incoming communication, such as an email, from a computing device associated with a user. The email may include information (e.g., a sender, one or more recipients, title and body text, images, emoji, audio/video data, etc.). The computing system may determine at least one candidate response to the message by analyzing the information, identify other incoming messages that are similar to the email, determine a type of information that is typically included in a response to such an email, and determine, based on the type of information, at least one response to the email. The computing system may send the at least one candidate response to the computing device, which may output the at least one candidate response and receive an indication of a selection of one of the candidate responses, thereby enabling the user to select a particular candidate response and send the particular candidate response to one or more other computing devices (e.g., as a response to the email).

In this manner, techniques of the present disclosure may enable a user to send relevant responses to incoming communications without having to manually enter the response. Allowing a user to select from one or more candidate responses may be particularly helpful when it may be difficult or undesirable for the user to manually enter textual information for a response. Techniques of the present disclosure may enable a computing device to increase the user's efficiency by predicting, based on a received incoming communication, how a user is likely to respond. Accordingly, a computing device configured in accordance with techniques of this disclosure may reduce or remove the need for the user to spend time manually entering information for a response to an incoming communication.

In general, a computing device of a user may send information (e.g., incoming communications, location information, other contextual information, etc.) to the computing system only if the computing device receives permission from the user to send the information. For example, in situations discussed below in which the computing device may collect, transmit, or may make use of personal information about a user (e.g., incoming communications) the user may be provided with an opportunity to control whether programs or features of the computing device can collect user information (e.g., information about a user's communications, a user's social network, a user's social actions or activities, a user's profession, a user's preferences, or a user's current location), or to control whether and/or how the computing device may store and share user information.

In addition, certain data may be treated in one or more ways before it is stored, transmitted, or used by the computing device so that personally identifiable information is removed. For example, a user's identity may be treated so that no personally identifiable information can be determined about the user, or a user's geographic location may be generalized where location information is obtained (such as to a city, ZIP code, or state level), so that a particular location of the user cannot be determined. Thus, the user may have control over how information is collected about the user and stored, transmitted, and/or used by the computing device.

FIG. 1 is a conceptual diagram illustrating an example computing environment 1 and GUI 20 for providing candidate responses to an incoming communication, in accordance with one or more aspects of the present disclosure. As shown in the example of FIG. 1, computing environment 1 includes computing device 2A, network 12, and response suggestion system 14. Examples of computing device 2A may include, but are not limited to, portable, mobile, or other devices, such as mobile phones (including smartphones), laptop computers, desktop computers, tablet computers, smart television platforms, personal digital assistants (PDAs), server computers, mainframes, and the like. For instance, in the example of FIG. 1, computing device 2A may be a smartphone.

Computing device 2A, as shown in the example of FIG. 1, includes user interface (UI) device 4. UI device 4 of computing device 2A may be configured to function as an input device and/or an output device for computing device 2A. UI device 4 may be implemented using various technologies. For instance, UI device 4 may be configured to receive input from a user through tactile, audio, and/or video feedback. Examples of input devices include a presence-sensitive display, a presence-sensitive or touch-sensitive input device, a mouse, a keyboard, a voice responsive system, video camera, microphone or any other type of device for detecting a command from a user. In some examples, a presence-sensitive display includes a touch-sensitive or presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive technology. That is, UI device 4 of computing device 2A may include a presence-sensitive device that may receive tactile input from a user of computing device 2A. UI device 4 may receive indications of the tactile input by detecting one or more gestures from the user (e.g., when the user touches or points to one or more locations of UI device 4 with a finger or a stylus pen).

UI device 4 may additionally or alternatively be configured to function as an output device by providing output to a user using tactile, audio, or video stimuli. Examples of output devices include a sound card, a video graphics adapter card, or any of one or more display devices, such as a liquid crystal display (LCD), dot matrix display, light emitting diode (LED) display, organic light-emitting diode (OLED) display, e-ink, or similar monochrome or color display capable of outputting visible information to a user of computing device 2A. Additional examples of an output device include a speaker, a cathode ray tube (CRT) monitor, a liquid crystal display (LCD), or other device that can generate intelligible output to a user. For instance, UI device 4 may present output to a user of computing device 2A as a graphical user interface that may be associated with functionality provided by computing device 2A. In this way, UI device 4 may present various user interfaces of applications executing at or accessible by computing device 2A (e.g., an electronic message application, an Internet browser application, etc.). A user of computing device 2A may interact with a respective user interface of an application to cause computing device 2A to perform operations relating to a function.

In some examples, UI device 4 of computing device 2A may detect two-dimensional and/or three-dimensional gestures as input from a user of computing device 2A. For instance, a sensor of UI device 4 may detect the user's movement (e.g., moving a hand, an arm, a pen, a stylus, etc.) within a threshold distance of the sensor of UI device 4. UI device 4 may determine a two or three dimensional vector representation of the movement and correlate the vector representation to a gesture input (e.g., a hand-wave, a pinch, a clap, a pen stroke, etc.) that has multiple dimensions. In other words, UI device 4 may, in some examples, detect a multi-dimension gesture without requiring the user to gesture at or near a screen or surface at which UI device 4 outputs information for display. Instead, UI device 4 may detect a multi-dimensional gesture performed at or near a sensor which may or may not be located near the screen or surface at which UI device 4 outputs information for display.

In the example of FIG. 1, computing device 2A includes user interface (UI) module 6, device location module 8, and application modules 10A-10N (collectively "application modules 10"). Modules 6, 8, and/or 10 may perform operations described herein using hardware, software, firmware, or a mixture thereof residing in and/or executing at computing device 2A. Computing device 2A may execute modules 6, 8, and/or 10 with one processor or with multiple processors. In some examples, computing device 2A may execute modules 6, 8, and/or 10 as a virtual machine executing on underlying hardware. Modules 6, 8, and/or 10 may execute as one or more services of an operating system or computing platform or may execute as one or more executable programs at an application layer of a computing platform.

UI module 6, as shown in the example of FIG. 1, may be operable by computing device 2A to perform one or more functions, such as receive input and send indications of such input to other components associated with computing device 2A, such as application modules 10. UI module 6 may also receive data from components associated with computing device 2A such as device location module 8 or application modules 10. Using the data received, UI module 6 may cause other components associated with computing device 2A, such as UI device 4, to provide output based on the data. For instance, UI module 6 may receive data from one of application modules 10 to display a GUI.

Application modules 10, as shown in the example of FIG. 1, may include functionality to perform any variety of operations on computing device 2A. For instance, application modules 10 may include a word processor, an email application, a web browser, a multimedia player, a calendar application, an operating system, a distributed computing application, a graphic design application, a video editing application, a web development application, or any other application. One of application modules 10 (e.g., application module 10A) may be a text messaging or Short Message Service (SMS) application. Application module 10A may include functionality to compose outgoing text message communications, receive incoming text message communications, respond to incoming text message communications, and other functions. Application module 10A, in various examples, may provide data to UI module 6 causing UI device 4 to display a GUI.

In some examples, one or more of application modules 10 may be operable to receive incoming communications from other devices (e.g., via network 12). For instance, one or more of application modules 10 may receive email messages for an account associated with a user of computing device 2A, calendar alerts or meeting requests for a user of computing device 2A, or other incoming communications.

Incoming communications may include information (e.g., generated in response to input by users of the other devices). Examples of information include text (e.g., any combination of letters, words, numbers, punctuation, etc.), emoji, images, video, audio, or any other content that may be included in an incoming communication. In the example of FIG. 1, application module 10A may receive an incoming communication (e.g., a text message) from another computing device (not shown). The received text message may include the information "Are you coming to the pub?"

In some examples, UI device 4 may detect input corresponding to a user's selection of an option to respond to an incoming communication. UI module 6 may receive an indication of the input and provide data to one or more of application modules 10 based on the indication. In some examples, responsive to receiving the data, the receiving one of applications 10 may generate a request for candidate responses to the incoming communication. For instance, in the example of FIG. 1, application 10A may generate a request for candidate responses to the text message. The request may include an indication of at least part of the information included in the text message. In some examples, the request may include other information, such as location information, user information, or other information about computing device 2A or a user of computing device 2A. Application 10A may only generate the request and/or obtain personal data (e.g., information included in the text message and/or other information) if the user of computing device 2A provides explicit permission. After receiving the explicit permission, computing device 2A may transmit the request via network 12 (e.g., to response suggestion system 14).

Network 12 represents any public or private communication network, such as a cellular network, Wi-Fi network, or other type of network for transmitting data between computing devices. In some examples, network 12 may represent one or more packet switched networks, such as the Internet. Computing device 2A and response suggestion system 14 may send and receive data across network 12 using any suitable communication techniques. For example, computing device 2A and response suggestion system 14 may each be operatively coupled to network 12 using respective network links. Network 12 may include network hubs, network switches, network routers, etc., that are operatively inter-coupled thereby providing for the exchange of information between computing device 2A and response suggestion system 14. In some examples, network links of network 12 may be Ethernet, ATM or other network connections. Such connections may include wireless and/or wired connections. Network 12 may receive the request from computing device 2A and provide the request to response suggestion system 14.

Response suggestion system 14 may represent any suitable remote computing system, such as one or more desktop computers, laptop computers, mainframes, servers, cloud computing systems, etc. capable of sending and receiving information via network 12. In some examples, response suggestion system 14 may represent a cloud computing system that provides one or more services via network 12. That is, in some examples, response suggestion system 14 may be a distributed computing system. One or more computing devices, such as computing device 2A, may access the services provided by the cloud by communicating with response suggestion system 14. While described herein as being performed at least in part by response suggestion system 14, any or all techniques of the present disclosure may be performed by one or more other devices, such as computing device 2A. That is, in some examples, computing device 2A may be operable to perform one or more techniques of the present disclosure alone.

In the example of FIG. 1, response suggestion system 14 includes suggestion module 18. Suggestion module 18 may be operable to determine at least one candidate response to an incoming communication based at least in part on information included in the incoming communication. Each candidate response may be a predicted message that a user may choose to send in response to an incoming communication. For instance, in the example of FIG. 1, each candidate response determined by suggestion module 18 may be a prediction of a message that the user of computing device 2A may send in order to respond to the text message, "Are you coming to the pub?"

Suggestion module 18 may determine candidate responses from responses previously selected by one or more users (e.g., the user of computing device 2A and/or other users). That is, response suggestion system 14 may receive information, such as message histories, from various sources (e.g., computing device 2A and/or computing devices associated with other users) indicating incoming communications and the responses that users have selected as responses to the incoming communications. That is, response suggestion system 14 may receive a plurality of message histories associated with different users and that include message and response pairs. The message histories may be one or more of a simple messaging service message history, multimedia messaging service message history, an instant messaging message history, or an email message history.

In some examples, text analysis module 16 of response suggestion system 14 may classify each response in the message histories as having one of a set of information types. For example, the responses to "when works for you?" may include "6 pm," "in 10 minutes," "now," etc. Based on those responses, text analysis module 16 may classify responses to "when works for you" as having the information type "TIME." Similarly, text analysis module 16 may analyze the responses to "LGTM," which may include "thank you," "great!," "whew," etc. and determine that the responses have the information type "TEXT." As yet another example, the responses to "how many would you like?" may include "1," "2," "a few," "several," etc. Based on those responses, text analysis module 16 may classify responses to "how many would you like" as having the information type "NUMBER."

By analyzing the incoming communications and the corresponding selected responses (e.g., chat logs), text analysis module 16 and suggestion module 18 (or other components of response suggestion system 14) may determine likely replies to messages. That is, text analysis module 16 and suggestion module 18 may generate a mapping of a part of a conversation to a particular response based on prior conversations. For instance, text analysis module 16 may receive a request including the information, "Are you coming?" Text analysis module 16 may analyze the request, determine a likely response includes textual information, and suggestion module 18 may determine that the most common replies to the request include "I'll be right there," "yes," and "no."

In some examples, the information included in the incoming communication and/or the candidate responses need not be proper language. For instance, response suggestions system 14 may receive a request to determine candidate responses for the text, "<3" (e.g., a heart emoticon). Text analysis module 16 may determine that such a message should have a response type of EMOTICON and, based on that, suggestion module 18 may determine that the most common responses are "<3", and ":)" (e.g., a smiley emoticon). In some examples, candidate responses may be responses that have been selected at least at a threshold frequency by the one or more users. In other examples, candidate responses may be based additionally or instead on manual review by developers or administrators of response suggestion system 14. Manual review may be beneficial, for example, to ensure candidate responses are appropriate.

In some examples, suggestion module 18 may determine candidate responses based at least in part on an identity of the user of computing device 2A and/or information about the user of computing device 2A. Suggestion module 18 (or other components of response suggestion system 14) may receive a request from computing device 2A that includes an indication of a particular incoming communication as well as an indication of the identity of the recipient of the incoming communication. Suggestion module 18 may provide personalized candidate responses based on the identity of the recipient. In another example, suggestion module 18 may receive explicit permission from a user (e.g., the user of computing device 2A) to access communications information, social media network information, or other information pertaining to the user. For example, if the expected response type is ADDRESS, suggestion module 18 may include a home address, work address, or other address associated with the user.

Response suggestion system 14 may send one or more of the candidate responses to computing device 2A. One of applications 10 may receive an indication of the determined candidate responses, and send data to UI module 6 to cause UI device 4 to display the candidate responses. For instance, in the example of FIG. 1, application 10A may receive candidate responses to the text message, as determined by suggestion module 18 of response suggestion system 14. Responsive to receiving the indication of the candidate responses, application 10A may send data to UI module 6 to cause UI device 4 to display the candidate responses as part of GUI 20.

As shown in the example of FIG. 1, GUI 20 includes response selection area 22. Response selection area 22 may be displayed in response to computing device 2A receiving input corresponding to a command to respond to the incoming communication. Response selection area 22 includes response options 24A-24D (collectively "response options 24"). In some examples, response options 24 may represent candidate responses received from response suggestion system 14. In other examples, response selection area 22 may represent other response options, such as responses previously entered by the user of computing device 2A to similar incoming communications. In some examples, the candidate responses received by computing device 2A may be modified (e.g., by a receiving one of applications 10) based on various types of information, and response selection area 22 may contain one or more response options representing modified candidate responses. In any case, response selection area 22 of GUI 20 may enable the user of computing device 2A to select one of response options 24, such as response option 24A including the displayed text "I'll be there in 15 minutes," response option 24B including the displayed text "I'm on my way," or other response options.

Inputting and selecting a custom response or selection of one of response options 24 may cause computing device 2A to respond to the incoming communication by sending the the selected response to one or more other computing devices. The selected response (e.g., the one of response options 24 selected by the user) may be sent to a computing device from which the incoming communication was received. In some examples, the selected response may be sent to additional or other computing devices. By enabling computing device 2A to obtain candidate responses and display response options 24, response suggestion system 14 may reduce the amount of time required for a user of computing device 2A to input and send a response to an incoming communication. For instance, wearable computing devices, such as watches or other devices, may be able to display several candidate responses to a user that are based on a received incoming communication, thereby enabling the user to quickly tap or otherwise select one of the candidate responses instead of having to use voice recognition or other means to input a response.

Figure 2:
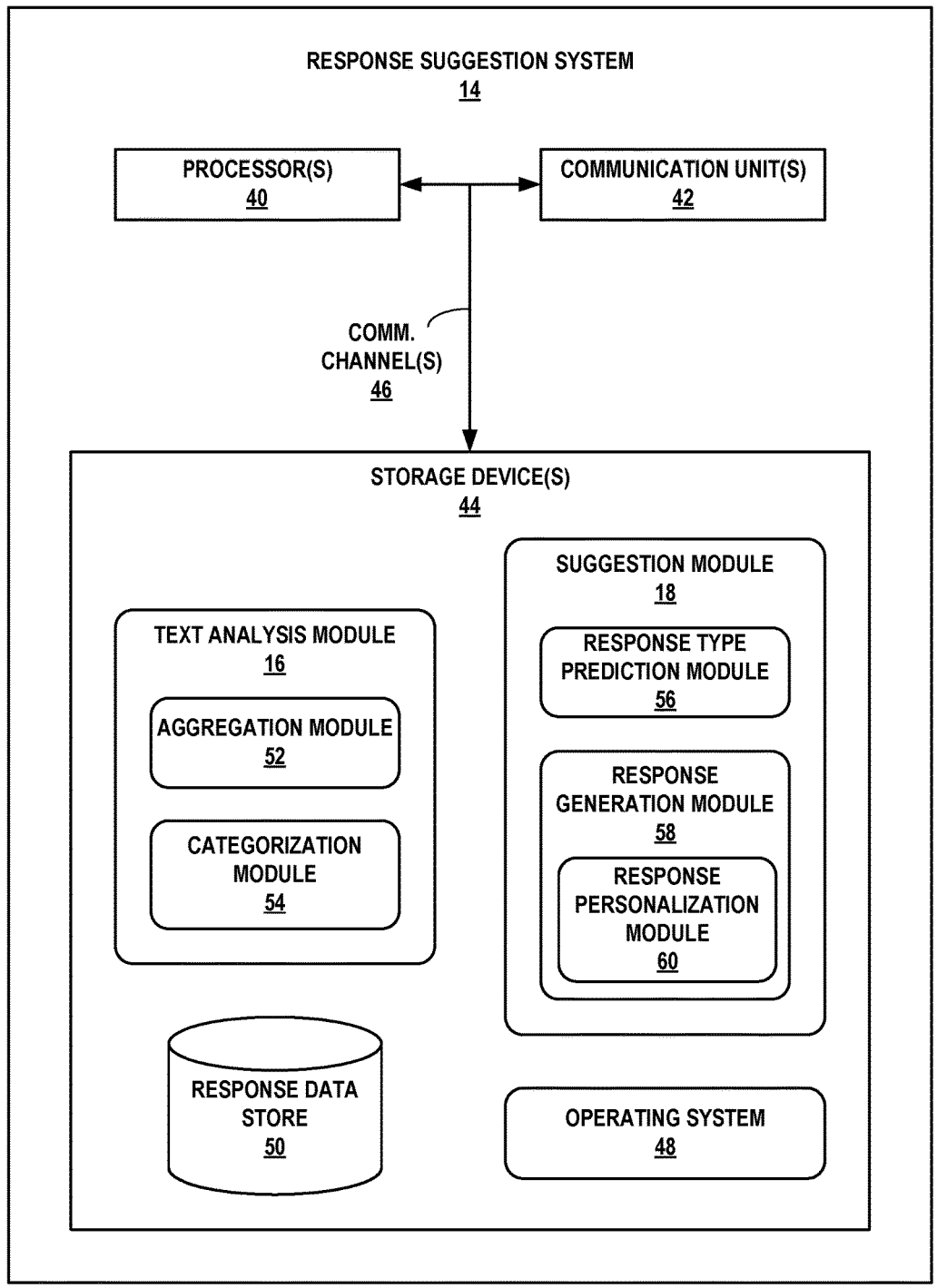
FIG. 2 is a block diagram illustrating one example of a response suggestion unit for providing candidate responses to an incoming communication, in accordance with one or more aspects of the present disclosure.

FIG. 2 is a block diagram illustrating one example of response suggestion system 14, shown in FIG. 1, for providing candidate responses to an incoming communication, in accordance with one or more aspects of the present disclosure. Response suggestion system 14 may include hardware, firmware, software, or any combination thereof. In the example of FIG. 2, response suggestion system 14 may comprise a hardware device, such as a server computer, having various hardware, firmware, and software components. However, FIG. 2 illustrates only one particular example of response suggestion system 14, and many other examples of response suggestion system 14 may be used in accordance with techniques of the present disclosure. In some examples, components of response suggestion system 14 may be located in a singular location. In other examples, one or more components of response suggestion system 14 may be in different locations (e.g., connected via network 12 of FIG. 1). That is, in some examples response suggestion system 14 may be a conventional computing system, while in other examples, response suggestion system 14 may be a distributed or "cloud" computing system.

As shown in the specific example of FIG. 2, response suggestion system 14 includes one or more processors 40, one or more communications units 42, and one or more storage devices 44. Response suggestion system 14 further includes operating system 48, text analysis module 16, suggestion module 18, and response data store 50. In other examples, response data store 50 may not be included in response suggestion system 14 and may, for example, be stored at a different computing system operatively and/or communicatively coupled to response suggestion system 14. That is, in some examples, response data store 50 may be external to, but accessible by, response suggestion system 14.

Each of components 40, 42, and 44 may be interconnected (physically, communicatively, and/or operatively) for inter-component communications. In the example of FIG. 2, components 40, 42, and 44 may be coupled by one or more communications channels (COMM. CHANNELS) 46. In some examples, communications channels 46 may include a system bus, network connection, inter-process communication data structure, or any other channel for communicating data. In other examples, such as where response suggestion system 14 is a distributed computing system or cloud-based computing system, communications channels 46 may include one or more network connections, such as portions of network 12 of FIG. 1. Modules 16, 50, and 52, as well as operating system 48, and response data store 50 may also communicate information with one another as well as with other components in response suggestion system 14.

Processors 40, in one example, are configured to implement functionality and/or process instructions for execution within response suggestion system 14. For example, processors 40 may be capable of processing instructions stored in storage devices 44. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry, including other hardware processors.

Response suggestion system 14, in the example of FIG. 2, also includes one or more communication units 42. Response suggestion system 14, in one example, utilizes communication units 42 to communicate with external devices via one or more networks, such as network 12 of FIG. 1. Communication units 42 may include a network interface card, such as an Ethernet card, an optical transceiver, a radio frequency transceiver, or any other type of device that can send and receive information. Other examples of such network interfaces may include Bluetooth, 3G and WiFi radio components as well as Universal Serial Bus (USB). In some examples, response suggestion system 14 utilizes communication units 42 to wirelessly communicate with one or more external devices such as computing device 2A of FIG. 1. For instance, communication units 42 may receive a request for candidate responses from computing device 2A, and provide the request to one or more other components of response suggestion system 14 (e.g., modules 16, 18).

One or more storage devices 44 may be configured to store information within response suggestion system 14 during operation. Storage devices 44, in some examples, can be described as a computer-readable storage medium. In some examples, storage devices 44 are a temporary memory, meaning that a primary purpose of storage devices 44 is not long-term storage. Storage devices 44, in some examples, are described as a volatile memory, meaning that storage devices 44 do not maintain stored contents when the computer is turned off. Examples of volatile memories include random access memories (RAM), dynamic random access memories (DRAM), static random access memories (SRAM), and other forms of volatile memories known in the art. In some examples, storage devices 44 are used to store program instructions for execution by processors 40. Storage devices 44, in one example, are used by software or applications running on response suggestion system 14 (e.g., modules 16, 50, and 52) to temporarily store information during program execution.

Storage devices 44, in some examples, also include one or more computer-readable storage media. Storage devices 44 may be configured to store larger amounts of information than volatile memory. Storage devices 44 may further be configured for long-term storage of information. In some examples, storage devices 44 include non-volatile storage elements. Examples of such non-volatile storage elements include magnetic hard discs, optical discs, floppy discs, flash memories, or forms of electrically programmable memories (EPROM) or electrically erasable and programmable memories (EEPROM).

In some examples, response suggestion system 14 may contain more or fewer components. For instance, response suggestion system 14 may contain one or more input devices, such as devices configured to receive input from a user or administrator through tactical, audio, or video feedback, and/or one or more output devices, such as devices configured to provide output to a user or administrator using tactile, audio, or video stimuli.

In the example of FIG. 2, response suggestion system 14 includes operating system 48. Operating system 48, in some examples, controls the operation of components of response suggestion system 14. For example, operating system 48, in one example, facilitates the communication of modules 16 and 18 with processors 40, communication units 42, and storage devices 44. Modules 16 and 18 may each include program instructions and/or data that are executable by response suggestion system 14. As one example, text analysis module 16 and suggestion module 18 may include instructions that cause response suggestion system 14 to perform one or more of the operations and actions described in the present disclosure.

Response suggestion system 14 may receive one or more message histories from a plurality of different computing devices (e.g., computing devices 2 of FIG. 1). The message histories may be one or more of a simple messaging service message history, multimedia messaging service message history, an instant messaging message history, or an email message history. Text analysis module 16 may analyze the message histories and generate a set of popular response types and responses based on the message histories. For example, text analysis module 16 may create a table of responses that includes information about message and response pairs. That is, the table may include information about the received message, such as the text of the received message, and information about the reply, such as the text of the reply message. In various examples, the table includes additional information about the message/response pair, such as a type of the message and a type of the response. The message/response table may be stored, in various instances, within response data store 50. While described as a table, the message and response information may be stored within data store 50 using a range of one or more data structures, such as an array, a list, a database, a structured file (such as a file encoded using a markup language) or other data structure. That is, response data store 50 may contain data in any format capable of being created and/or accessed by one or more other components of response suggestion system 14.

In some examples, response data store 50 may include information received from users and/or information provided by managers or administrators of response suggestion system 14. For instance, response data store 50 may receive instructions from one or more modules of response suggestion system 14 (e.g., aggregation module 52, categorization module 54, etc.) to create or modify data within response data store 50. In some examples, response data store 50 may require administrator approval before storing or modifying information. Requiring administrator approval before storing or modifying information may help to ensure that erroneous or inappropriate responses are not stored and thus not suggested as subsequent candidate responses. In other examples, response data store 50 may automatically store information as instructed by aggregation module 52 and/or categorization module 54, such as when other management procedures are used.

Aggregation module 52 may analyze the message histories and store the message and response information within response data store 50. For example, aggregation module 52 may process each message history from the one or more message histories and break the message history down into individual message and response pairs. Each message history may include time information, sender information, and contents information for each message included in the message history. Aggregation module 52 iterates over each message and each message history. For each message, aggregation module 52 determines a message (e.g., message N) that immediately precedes another message (e.g., message M) in the message history. In this example, message N is the message having the greatest timestamp that is less than the timestamp of message M. Aggregation module 52 analyzes the senders for message N and message M. If the senders of message N and M are different, aggregation module 52 normalizes the contents of message N and the content of message M and inserts at least the normalized contents of messages N and M into the message/response table. In normalizing the content, aggregation module 52 may change the contents of the messages N and M to be consistent cases (e.g., all lowercase, all uppercase, etc.), may remove all punctuation, correct any misspellings, etc.

In some examples, the message and response pairs may include more than one message and/or more than one response in instances where aggregation module 52 determines that multiple different messages are associated with a single response or multiple different responses are associated with a single message. For example, aggregation module 52 may determine that the message "what time?" immediately followed by the message "do you want to meet?" should be considered a single message for purposes of processing the message history. As another example, aggregation module 52 may determine that the response "5 pm" immediately followed by the message "tomorrow" should be considered a single response for purposes of processing the message history. Aggregation module 52 may determine that the two messages/responses should be analyzed as a single message/response based on various factors including text proximity (i.e., does message B immediately follow message A or is there an intervening message or response?) and time proximity (i.e., did the user send message B within a threshold amount of time of sending message A, such as 1 second, 3 seconds, 5 seconds, etc.) Thus, even though a user may have entered two messages—"what time?" and "do you want to meet?"—and the recipient entered two responses—"5 pm" and "tomorrow"—aggregation module 52 may determine that the messages and responses should be analyzed as a single message and a single response.

After aggregation module 52 has stored information for at least one message and response pair in the message and response table, aggregation module 52 may begin aggregating the responses for each message based on the normalized contents of the responses. That is, for a particular message, aggregation module 52 may identify responses having the same normalized contents (e.g., two responses having the contents "6 pm" would be identified as having the same normalized contents), counts the number of responses having the same normalized responses for a particular message, and stores the count in a row for the particular message and response pair. In other words, aggregation module 52 of response suggestion system 14 determines a number of instances of each response for each message from the plurality of message and response pairs. As stated differently, aggregation module 52 consolidates the entries in the message and response table such that there is a single row for each unique response for a particular message and the row for the unique message and response pair includes a count of the number of times the particular response was used for the particular message.

Categorization module 54 may categorize the information included in the messages and responses as having a particular information type. That is, categorization module 54 may apply one or more classifiers to the responses in the message and response table to classify the responses as having an information type. Example classifiers include, but are not limited to, an address classifier, a chain store classifier, an emoji classifier, a celebrity classifier, a date classifier, a day of week classifier, a time classifier, etc. In general, the classifiers may be rules configured to detect a particular type of information. The classifiers may be for any type of information and are not limited to the few examples provided.

Categorization module 54 may apply a time classifier to the responses to "when works for you?". The responses may include "6 pm," "in 10 minutes," "now," etc. Based on those responses and using the time classifier, categorization module 54 may classify the responses to "when works for you" as having the information type "TIME." Similarly, categorization module 54 may analyze the responses to "LGTM," which may include "thank you," "great!," "whew," etc. and determine that the responses have the information type "UNKNOWN" as none of the classifiers may be appropriate. As yet another example, the responses to "how many would you like?" may include "1," "2," "a few," "several," etc. Based on those responses, text analysis module 16 may classify responses to "how many would you like" as having the information type "QUANTITY" by, for example, applying a quantity classifier.

In some examples, categorization module 54 may apply an address classifier, which can detect that "123 Main St" is an address but "hello" is not. As another example, categorization module 54 may apply a chain classifier, which can detect that MegaChainStore and OtherChainStore are chain stores, but that "thank you" is not a chain store. Categorization module 54 may apply an emoji classifier, which can detect that ";)" and ":-)" are emoji but "!" is not an emoji. The celebrity classifier may detect that "Barack Obama" and "Taylor Swift" are celebrities but "Joe" is not a celebrity. Similarly, a time classifier may detect that "6 pm" and "18:00" are times but "tomorrow" is not a time, while a date classifier may detect that "tomorrow" and "July 4th" are dates but "July" is not a date. As another example, a day of week classifier may detect that "Sunday" and Monday" are days of the week but "Labor Day" is not a day of the week. Thus, in general, categorization module 54 may apply one or more classifiers to the normalized response contents to classify the responses as having one or more different information types.

Categorization module 54 may then invoke aggregation module 52 to further aggregation the responses based on the information type for each normalized response. For example, aggregation module 52 may, for a particular message, count a number of responses having each information type (e.g., ADDRESS, TIME, EMOJI, CELEBRITY, UNKNOWN, etc.). Aggregation module 52 stores the total number of responses for each information type within the message and response table. That is, after text analysis module 16 analyzes the message histories, text analysis module 16 of response suggestion system 14 stores an indication of each unique message from the plurality of message and response pairs, an indication of the information type associated with the respective response associated with the unique message, and a number of responses from the plurality of message and response pairs having the information type. In some examples, text analysis module 16 may generate a list of the most common responses to each message, which may be quickly accessed when response suggestion system 14 receives a request for suggested responses to a particular incoming communication.

Using the message and response table, suggestion module 18 may determine one or more candidate responses for incoming communications. As shown in FIG. 2, suggestion module 18 includes response type prediction module 56, response generation module 58, and response personalization module 60. Suggestion module 18 may receive a request for a candidate response from one or more remote computing devices, such as computing device 2A of FIG. 1. The request may include at least a portion of the contents of the incoming communication. However, the request for candidate responses may, in some examples, include other information. The other information may include information pertaining to the computing device that sent the request and/or information pertaining to a user of the computing device that sent the request. For instance, a request may include a unique identifier (e.g., an ID number) identifying the user and/or the computing device that sent the request, location information indicating one or more locations of the computing device, time information indicating a time and/or time zone setting of the computing device, application information indicating an application currently being executed by the computing device and/or an activity in which the application currently being executed is engaging, communications information indicating the type of the incoming communication (e.g., email, text message, calendar alert, or other type), the type of response that the computing device will be sending, the time at which the incoming communication was received, previous communications to or from the sender, user information indicating an occupation of the user, an activity in which the user is currently engaged, contact information indicating the sender of the incoming communication, one or more recipients of the response that the computing device will be sending, or other information. That is, the request for candidate responses may include any information usable by one or more components of response suggestion system 14 to determine a current context of the computing device and tailor candidate responses to better predict a response to the incoming communication. Communications unit 42 of response suggestion system 14 may receive the request for candidate responses and send the request to one or more other components of response suggestion system 14, such as suggestion module 18.

In the example of FIG. 2, suggestion module 18 may be operable by processors 40 to receive a request for candidate responses, obtain information from one or more other sources, and/or determine a current context for the request. That is, in some examples, suggestion module 18 may obtain information included in a received incoming communication and other information (e.g., from the request for candidate responses or other sources) and determine a context on which to base predicted replies to the incoming communication. In some examples, suggestion module 18 may determine a context based on the information included in the request for candidate responses. In other examples, suggestion module 18 may additionally or alternatively obtain supplemental information from other sources, such as an email account associated with a user of the computing device that sent the request, a social networking account of the user, web search history associated with the user, a location history associated with the user, or other sources.

Suggestion module 18 may only obtain supplemental information for a user if the user provides explicit permission. That is, suggestion module 18 may only use various sources of information for predicting candidate responses if a user of the computing device that sent the request (e.g., computing device 2) explicitly allows response suggestion system 14 to access the various sources. For instance, computing device 2A may prompt the user to provide a username and password for an email account, a social network service account, or other account. After receiving the information, computing device 2A may prompt the user to allow response suggestion system 14 to access the account to obtain supplemental information. If the user explicitly agrees to allow access, computing device 2A may send an indication of the account and access credentials (e.g., a username and password or other information) to response suggestion system 14. If response suggestion system 14 receives explicit permission, suggestion module 18 may obtain supplemental information.

Suggestion module 18 analyzes the request for candidate responses and extracts the included contents of the incoming communication to which computing device 2A is requesting candidate responses. Response type prediction module 56 may determine which types of responses are popular for responding to a message with the contents of the incoming communication. For example, response type prediction module 56 may perform a lookup in response data store 50 based on at least a portion of the contents of the incoming communication to retrieve information on one or more popular types of responses. As one example, if the incoming communication includes the contents "how are you doing?", a popular response type may be "EMOJI" or "UNKNOWN." A type of response may be a popular type of response if, for example, a percentage of all replies to incoming communications having the same contents exceeds a threshold popularity value (e.g., greater than fifteen percent, twenty-five percent, fifty percent, etc.). The lookup performed by response type prediction module 56 on response data store 50 returns each type of response that satisfies the threshold popularity value. In some examples, none of the response types may be popular enough to satisfy the threshold popularity value. In such instances, response type prediction module 56 may retrieve a certain number of the most popular response types, such as three, five, etc.

Response generation module 58 may generate a plurality of possible responses to send to computing device 2A by, for example, retrieving popular responses having one or more of the types determined by response type prediction module 56. For example, if the incoming communication includes the contents "how are you doing?", the popular responses of response type EMOJI may include a thumbs up emoji, a thumbs down emoji, a happy face emoji, or other emoji.

For certain response types, response personalization module 60 may customize the possible candidate responses. As one example, if the incoming communication includes the content "where do you live?", response type prediction module 56 may determine that the predicted response type is ADDRESS and response generation module 58 may determine that the content of the incoming communication indicates that the response should include an address of the user to whom the incoming communication is directed. Response personalization module 60 may determine the home address of the user and populate a candidate response with the home address. As another example, if the incoming communication includes the contents "what time can I call you?", the predicted response type may be TIME and response generation module 58 may determine a list of the most common times included in responses. However, the most popular times may not be times at which the user is available. Instead of merely providing the most popular times, response personalization module 60 may analyze a calendar of the user, messaging/phone usage habits of the user, sleeping habits of the user, etc. and determine one or more at which the user is predicted to be available and include those times as possible candidate responses.

In some examples, response personalization module 60 may also customize the suggested candidate responses based on other factors, such as the type of the incoming communication (e.g., email, SMS, asynchronous, synchronous, long form, short form, etc.), the type of device that received the incoming communication (e.g., smartphone, watch, portable computer, etc.), etc. Personalization module 60 may also maintain a history of candidate responses selected by the user (i.e., candidate responses used by the user to reply to incoming communications) and may personalize the candidate responses based on the responses selected by the user.

Suggestion module 18 sends the list of candidate responses to computing device 2A via communication units 42. Computing device 2A may display the list of suggested responses and detect a user input selecting one or more of the candidate responses or inputting a different response to the incoming communication. Computing device 2A may provide an indication of the user input to response suggestion system 14 for inclusion in the candidate response history for the user and for analysis by text analysis module 16 and inclusion in response data store 50. In this way, the candidate response types and suggested candidate responses may be continually updated and improved based how various users actually respond to incoming communications.

By determining the various types of responses actually used by various users and further determining popular responses of the particular types, response suggestion system 14 may decrease the time and/or effort required to respond to incoming communications while increasing the likelihood that the candidate responses will actually be of interest to the user. Furthermore, by receiving an indication of a selected response and updating a database of stored responses and associated context information, response suggestion system 14 may continually improve the suggested candidate responses, which may result in candidate responses that are more likely to be relevant to a user's current situation. Consequently, in accordance with one or more techniques of the present disclosure, the user may be presented with at least one response option that he or she may select to send as a response to an incoming communication thereby reducing the likelihood that the user will need to manually enter a response.

FIG. 3 is a conceptual diagram illustrating example data generated while classifying responses, in accordance with one or more aspects of the present disclosure. The example of FIG. 3 is described below within the context of FIG. 2.

Figure 4:
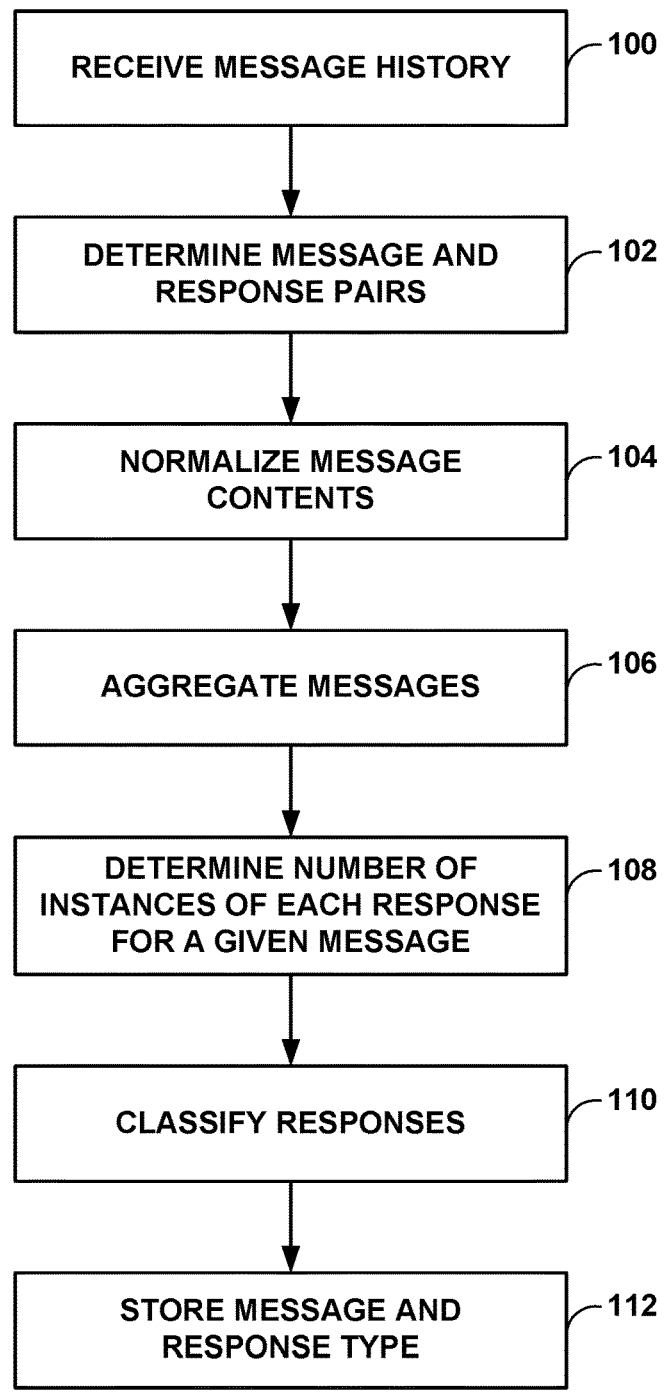
FIG. 4 is a flow diagram illustrating an example operation for analyzing responses to incoming communications, in accordance with one or more aspects of the present disclosure.

Text analysis module 16 may analyze the message histories received by response suggestion system 14 and generate a set of popular response types and responses based on the message histories. For example, text analysis module 16 may create a table of responses that includes information about message and response pairs. That is, the table may include information about the received message, such as the text of the received message, and information about the reply, such as the text of the reply message. Tables 70-76 of FIG. 4 illustrate various tables that may be stored within response data store 50 and that may be generated and/or modified by text analysis module 16 while generating the set of popular response types and responses.

In various examples, tables 70-76 may include additional information about the message/response pair, such as a type of the message and a type of the response. The message/response table may be stored, in various instances, within response data store 50. While described as a table, the message and response information may be stored within data store 50 using a range of one or more data structures, such as an array, a list, a database, a structured file (such as a file encoded using a markup language) or other data structure. That is, response data store 50 may contain data in any format capable of being created and/or accessed by one or more other components of response suggestion system 14.

Aggregation module 52 may analyze the message histories and store the message and response information within table 70. For example, aggregation module 52 may process each message history from the one or more message histories and break the message history down into individual message and response pairs, each of which may be stored in a separate row of table 70. For example, the first row of table 70 stores the message and response pair "are you coming" and "on my way". Aggregation module 52 iterates over each message and each message history, normalizes the messages and responses, and inserts them into response data store 50.

After aggregation module 52 has stored information for at least one message and response pair in the message and response table (e.g., table 70), aggregation module 52 may begin aggregating the responses for each message based on the normalized contents of the responses and store the aggregated responses in table 72. That is, for a particular message, aggregation module 52 may identify responses having the same normalized contents (e.g., two responses having the contents "6 pm" would be identified as having the same normalized contents), counts the number of responses having the same normalized responses for a particular message, and stores the count in a row for the particular message and response pair, as shown in table 72. As stated differently, aggregation module 52 consolidates the entries in the message and response table such that there is a single row for each unique response for a particular message and the row for the unique message and response pair includes a count of the number of times the particular response was used for the particular message.

Categorization module 54 may categorize the information included in the messages and responses as having a particular information type and store the message and response type in addition to the number of response having that particular response type within table 74. That is, categorization module 54 may apply one or more classifiers to the responses in the message and response table to classify the responses as having an information type. Example classifiers include, but are not limited to, an address classifier, a chain store classifier, an emoji classifier, a celebrity classifier, a date classifier, a day of week classifier, a time classifier, etc. In general, the classifiers may be rules configured to detect a particular type of information. The classifiers may be for any type of information and are not limited to the few examples provided.

Categorization module 54 may then invoke aggregation module 52 to further aggregation the responses based on the information type for each normalized response. For example, aggregation module 52 may, for a particular message, count a number of responses having each information type (e.g., ADDRESS, TIME, EMOJI, CELEBRITY, UNKNOWN, etc.). Aggregation module 52 stores the total number of responses for each information type within message and response table 76. That is, after text analysis module 16 analyzes the message histories, text analysis module 16 of response suggestion system 14 stores an indication of each unique message from the plurality of message and response pairs, an indication of the information type associated with the respective response associated with the unique message, and a number of responses from the plurality of message and response pairs having the information type. In some examples, text analysis module 16 may generate a list of the most common responses to each message, which may be quickly accessed when response suggestion system 14 receives a request for suggested responses to a particular incoming communication.

Figure 5:
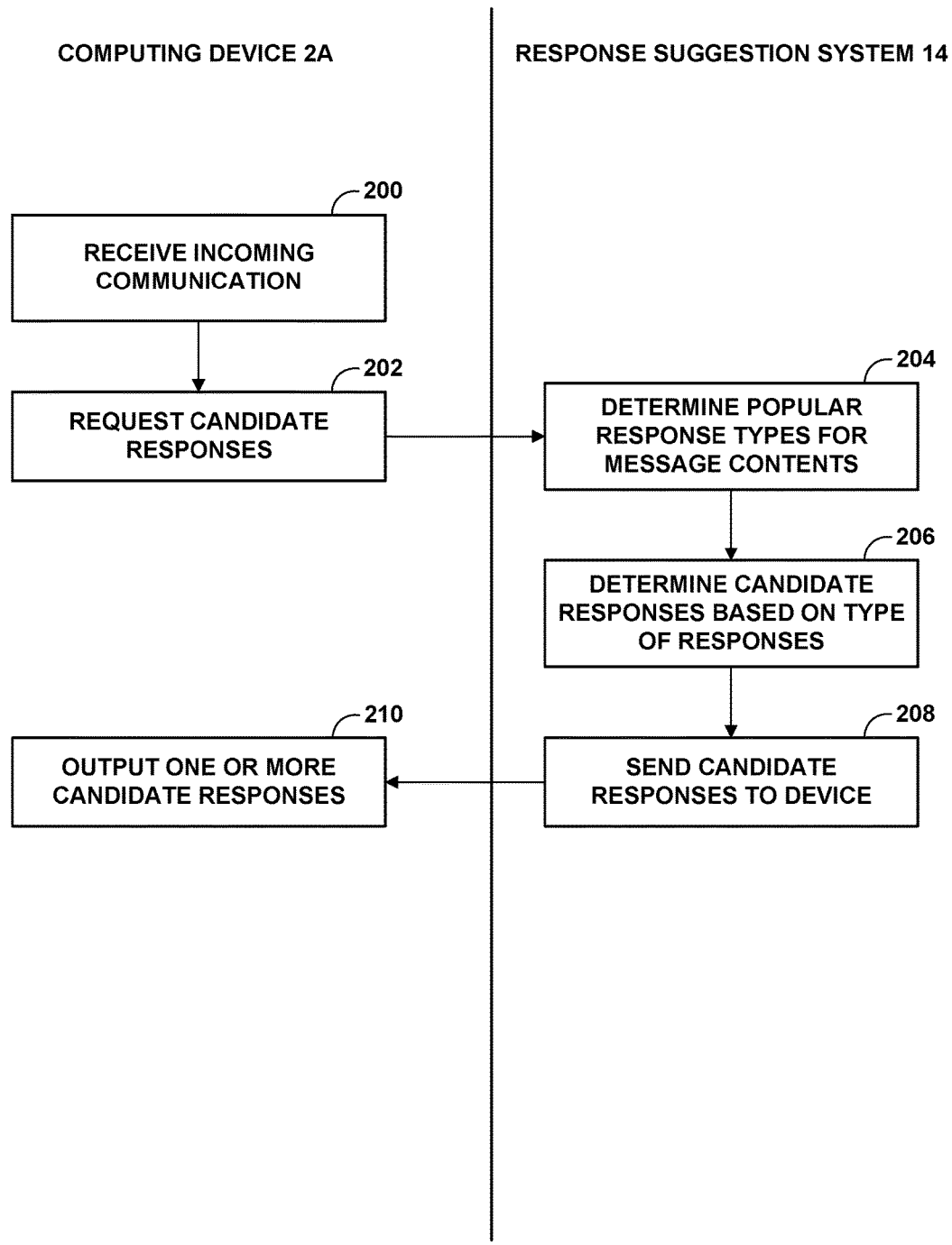
FIG. 5 is a flow diagram illustrating example operations for providing candidate responses to an incoming communication, in accordance with one or more aspects of the present disclosure.

FIG. 4 is a flow diagram illustrating an example operation for analyzing responses to incoming communications, in accordance with one or more aspects of the present disclosure. For purposes of illustration only, the example operations of FIG. 5 are described below within the context of FIGS. 1 and 2.

Response suggestion system 14 receives one or more message histories form one or more computing devices 2 (100). Each message history may include one or more of a simple messaging service message history, multimedia messaging service message history, an instant messaging message history, or an email message history.

Response suggestion system 14 determines, based on the message histories, a plurality of message and response pairs (102). For example, for each message, aggregation module 52 may determine a message (e.g., message N) that immediately precedes another message (e.g., message M) in the message history. Aggregation module 52 may analyze the senders for message N and message M. If the senders of message N and M are different, aggregation module 52 determines that messages N and M for a message and response pair (102).

Aggregation module 52 may further normalize each message from the plurality of message and response pairs (104). In normalizing the content, aggregation module 52 may change the contents of the messages N and M to be consistent cases (e.g., all lowercase, all uppercase, etc.), may remove all punctuation, correct any misspellings, etc.

Aggregation module 52 may aggregate the responses for each message based on the contents of the responses (106). As one example, for a particular message, aggregation module 52 may identify responses having the same normalized contents (e.g., two responses having the contents "6 pm" would be identified as having the same normalized contents). That is, aggregation module 52 may aggregate, based on a respective information type for each response from the one or more aggregated message and response pairs, the one or more aggregated message and response pairs into one or more consolidated message and response pairs.

In some examples, while aggregating the responses, aggregation module 52 may count the number of responses having the same normalized responses for a particular message (108). In other words, aggregation module 52 of response suggestion system 14 may determine a number of instances of each response for each message from the plurality of message and response.

Categorization module 54 of response suggestion system 14 may classify each response from the plurality of message and response pairs as having an information type (110). That is, categorization module 54 may apply one or more classifiers to the responses in the message and response table to classify the responses as having an information type. Example classifiers include, but are not limited to, an address classifier, a chain store classifier, an emoji classifier, a celebrity classifier, a date classifier, a day of week classifier, a time classifier, etc. Categorization module 54 may then invoke aggregation module 52 to further aggregation the responses based on the information type for each normalized response. In various instances, aggregation module 52 may also determine, based on the number of instances of each response, a respective consolidated number of instances of the respective information type for each of the one or more consolidated message and response pairs.

Aggregation module 52 may store an indication of each unique message from the plurality of message and response pairs, an indication of the information type associated with the respective response associated with the unique message, and a number of responses from the plurality of message and response pairs having the information type within response data store 50 (112). In some examples, aggregation module 52 further stores a respective indication of each of the one or more consolidated message and response pairs, a respective information type, and a respective consolidated number of instances of the respective information type.

FIG. 5 is a flow diagram illustrating example operations for providing candidate responses to an incoming communication, in accordance with one or more aspects of the present disclosure. For purposes of illustration only, the example operations of FIG. 5 are described below within the context of FIGS. 1 and 2.

Computing device 2A may receive an incoming communication from another computing device (e.g., computing device 2N) (200). The incoming communication includes information, is associated with a sender and a recipient. Responsive to receiving the incoming communication, computing device 2A may send a request for candidate responses to response suggestion system 14 (202).

Suggestion module 18 of response suggestion system 14 may be operable by processors 40 to receive a request for candidate responses, obtain information from one or more other sources, and/or determine a current context for the request. Suggestion module 18 analyzes the request for candidate responses and determines one or more popular response types based on the contents of the incoming communication (204). Response type prediction module 56 of suggestion module 18 may determine which types of responses are popular for responding to a message with the contents of the incoming communication. For example, response type prediction module 56 may perform a lookup in response data store 50 based on at least a portion of the contents of the incoming communication to retrieve information on one or more popular types of responses. The lookup performed by response type prediction module 56 on response data store 50 returns each type of response that satisfies a threshold popularity value.

Response generation module 58 may generate a plurality of possible responses to send to computing device 2A by, for example, retrieving popular responses having one or more of the types determined by response type prediction module 56 (206). For example, if the incoming communication includes the contents "what time do you want to meet?", the popular responses of response type TIME may include 8 am, 5 pm, and 7 pm. In other words, response generation module may determine, based at least in part on the plurality of popular responses and the type of information expected to be included in the response, one or more candidate responses. In some examples, the one or more candidate responses are determined based on the identity of the sender of the incoming communication and the identity of the recipient of the incoming communication. In some examples, the one or more candidate responses are determined based on a communication type of the incoming communication (e.g., email, simple messaging service, synchronous communication etc.).

Response suggestion system 14 sends an indication of the one or more candidate responses to computing device 2A (208). Computing device 2A receives the indication of the one or more candidate responses and displays information about at least one of the one or more candidate responses (210). Computing device 2A may be configured to display the candidate responses differently based on the type of information included in the candidate response. For example, if the candidate response includes information of type TIME, computing device 2A may display the most popular candidate response in a time picker user interface. As another example, if the candidate response includes information of type EMOJI, computing device 2A may display the candidate responses in an emoji picker user interface.

Example 1

A method comprising: receiving, by a computing system, a plurality of message histories, wherein each message history from the plurality of message histories includes one or more of a simple messaging service message history, multimedia messaging service message history, an instant messaging message history, or an email message history; determining, by the computing system and based on the plurality of message histories, a plurality of message and response pairs; determining, by the computing system, a number of instances of each response for each message from the plurality of message and response pairs; classifying, by the computing system, each response from the plurality of message and response pairs as having an information type; and storing, by the computing system, an indication of each unique message from the plurality of message and response pairs, an indication of the information type associated with the respective response associated with the unique message, and a number of responses from the plurality of message and response pairs having the information type.

Example 2

The method of example 1, further comprising: receiving, by the computing system and from a computing device, a request for a suggested response to an incoming communication, the request including an indication of the incoming communication; determining, by the computing system and based on the request, a type of information expected to be included in a response to the incoming communication; determining, by the computing system, and based on the request and the type of information, one or more candidate responses; and sending, by the computing system and to the computing device, an indication of the one or more candidate responses.

Example 3

The method of example 2, wherein the request for the suggested response to the incoming communication includes an identity of a sender of the incoming communication and an identity of the recipient of the incoming communication, and where the one or more candidate responses are determined based on the identity of the sender and the identity of the recipient.

Example 4

The method of any of examples 2 and 3, wherein the request for the suggested response to the incoming communication includes a communication type of the incoming communication, and wherein the one or more candidate responses are determined based on the communication type of the incoming communication.

Example 5

The method of any of examples 2-4, wherein the request for the suggested response to the incoming communication includes a device type of the computing device, and wherein the one or more candidate responses are determined based on the device type of the computing device.

Example 6

The method of any of examples 1-5, further comprising: normalizing, by the computing system, each message from the plurality of message and response pairs; aggregating, by the computing system and based on the normalized messages, the plurality of message and response pairs into one or more aggregated message and response pairs; and determining, by the computing system, a number of instances of each response for respective normalized messages from the aggregated message and response pairs, wherein classifying each response from the plurality of message and response pairs comprises classifying, by the computing system, each response from the one or more aggregated message and response pairs as having the information type.

Example 7

The method of example 6, further comprising: aggregating, by the computing system and based on a respective information type for each response from the one or more aggregated message and response pairs, the one or more aggregated message and response pairs into one or more consolidated message and response pairs; and determining, by the computing system and based on the number of instances of each response, a respective consolidated number of instances of the respective information type for each of the one or more consolidated message and response pairs, wherein storing the indication of each unique message from the plurality of message and response pairs includes storing, by the computing system, a respective indication of each of the one or more consolidated message and response pairs, a respective information type, and a respective consolidated number of instances of the respective information type.

Example 8

A computing system, comprising: at least one communication unit configured to receive a plurality of message histories, wherein each message history from the plurality of message histories includes one or more of a simple messaging service message history, multimedia messaging service message history, an instant messaging message history, or an email message history; a storage device; at least one processor; and at least one module, operable by the at least one processor to: determine, based on the plurality of message histories, a plurality of message and response pairs; determine a number of instances of each response for each message from the plurality of message and response pairs; classify each response from the plurality of message and response pairs as having an information type; and store, at the storage device, an indication of each unique message from the plurality of message and response pairs, an indication of the information type associated with the respective response associated with the unique message, and a number of responses from the plurality of message and response pairs having the information type.

Example 9

The computing system of example 8, wherein the at least one module is further operable by the at least one processor to: receive, via the at least one communication unit and from a computing device, a request for a suggested response to an incoming communication, the request including an indication of the incoming communication; determine, based on the request, a type of information expected to be included in a response to the incoming communication; determine, based on the request and the type of information, one or more candidate responses; and send, via the at least one communication unit and to the computing device, an indication of the one or more candidate responses.

Example 10

The computing system of example 9, wherein the request for the suggested response to the incoming communication includes an identity of a sender of the incoming communication and an identity of the recipient of the incoming communication, and wherein the one or more candidate responses are determined based on the identity of the sender and the identity of the recipient.

Example 11

The computing system of any of examples 9 and 10, wherein the request for the suggested response to the incoming communication includes a communication type of the incoming communication, and wherein the one or more candidate responses are determined based on the communication type of the incoming communication.

Example 12

The computing system of any of examples 9-11, wherein the request for the suggested response to the incoming communication includes a device type of the computing device, and wherein the one or more candidate responses are determined based on the device type of the computing device.

Example 13

The computing system of any of examples 8-12, wherein the at least one module is further operable by the at least one processor to: normalize each message from the plurality of message and response pairs; aggregate, based on the normalized messages, the plurality of message and response pairs into one or more aggregated message and response pairs; determine a number of instances of each response for respective normalized messages from the aggregated message and response pairs; and classify each response from the plurality of message and response pairs by at least classifying each response from the one or more aggregated message and response pairs as having the information type.

Example 14

The computing system of example 13, wherein the at least one module is further operable by the at least one processor to: aggregate, based on a respective information type for each response from the one or more aggregated message and response pairs, the one or more aggregated message and response pairs into one or more consolidated message and response pairs; determine, based on the number of instances of each response, a respective consolidated number of instances of the respective information type for each of the one or more consolidated message and response pairs; and store the indication of each unique message from the plurality of message and response pairs by at least storing a respective indication of each of the one or more consolidated message and response pairs, a respective information type, and a respective consolidated number of instances of the respective information type.

Example 15

A non-transitory computer-readable storage medium encoded with instructions that, when executed, cause at least one processor of a computing system to: receive a plurality of message histories, wherein each message history from the plurality of message histories includes one or more of a simple messaging service message history, multimedia messaging service message history, an instant messaging message history, or an email message history; determine, based on the plurality of message histories, a plurality of message and response pairs; determine a number of instances of each response for each message from the plurality of message and response pairs; classify each response from the plurality of message and response pairs as having an information type; and store an indication of each unique message from the plurality of message and response pairs, an indication of the information type associated with the respective response associated with the unique message, and a number of responses from the plurality of message and response pairs having the information type.

Example 16

The non-transitory computer-readable storage medium of example 15, wherein the instructions further cause the one or more processors to: receive, from a computing device, a request for a suggested response to an incoming communication, the request including an indication of the incoming communication; determine, based on the request, a type of information expected to be included in a response to the incoming communication; determine, based on the request and the type of information, one or more candidate responses; and send, to the computing device, an indication of the one or more candidate responses.

Example 17

The non-transitory computer-readable storage medium of example 16, wherein the request for the suggested response to the incoming communication includes an identity of a sender of the incoming communication and an identity of the recipient of the incoming communication, and wherein the one or more candidate responses are determined based on the identity of the sender and the identity of the recipient.

Example 18

The non-transitory computer-readable storage medium of any of examples 16 and 17 wherein the request for the suggested response to the incoming communication includes a communication type of the incoming communication, and wherein the one or more candidate responses are determined based on the communication type of the incoming communication.

Example 19

The non-transitory computer-readable storage medium of any of examples 15-18, wherein the instructions further cause the one or more processors to: normalize each message from the plurality of message and response pairs; aggregate, based on the normalized messages, the plurality of message and response pairs into one or more aggregated message and response pairs; determine a number of instances of each response for respective normalized messages from the aggregated message and response pairs; and classify each response from the plurality of message and response pairs by at least classifying each response from the one or more aggregated message and response pairs as having the information type.

Example 20

The non-transitory computer-readable storage medium of example 19, wherein the instructions further cause the one or more processors to: aggregate, based on a respective information type for each response from the one or more aggregated message and response pairs, the one or more aggregated message and response pairs into one or more consolidated message and response pairs; determine, based on the number of instances of each response, a respective consolidated number of instances of the respective information type for each of the one or more consolidated message and response pairs; and store the indication of each unique message from the plurality of message and response pairs by at least storing a respective indication of each of the one or more consolidated message and response pairs, a respective information type, and a respective consolidated number of instances of the respective information type.

Example 21

A computing system comprising means for performing the method recited by any of examples 1-8.

Example 22

A computer-readable storage medium comprising instructions that, when executed, cause one or more processors of a computing device to perform the method recited by any of examples 1-8.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
   receiving, by a computing system, a plurality of message histories, wherein each message history from the plurality of message histories includes one or more of a simple messaging service message history, multimedia messaging service message history, an instant messaging message history, or an email message history;
   determining, by the computing system and based on the plurality of message histories, a plurality of message and response pairs;
   determining, by the computing system, a number of instances of each response for each message from the plurality of message and response pairs;
   classifying, by the computing system, each response from the plurality of message and response pairs as having an information type, wherein the information type is one or more of time type, text type, number type, address type, emoji type, celebrity type, store type, day of week type, date type, or unknown type;
   storing, by the computing system and in a data store, an indication of each unique message from the plurality of message and response pairs, an indication of the information type associated with the respective response associated with the unique message, and a number of responses from the plurality of message and response pairs having the information type as message and response information;
   receiving, by the computing system and from a computing device, a request for a suggested response to an incoming communication, the request including an indication of the incoming communication;
   determining, by the computing system and based on the request and the message and response information stored in the data store, a type of information expected to be included in a response to the incoming communication, wherein the type of information is one or more of the time type, the text type, the number type, the address type, the emoji type, the celebrity type, the store type, the day of week type, the date type, or the unknown type;
   predicting, by the computing system, and based on the request and the type of information, one or more candidate response messages; and
   sending, by the computing system and to the computing device, an indication of the one or more candidate response messages.

2. The method of claim 1, wherein:
   the request for the suggested response to the incoming communication includes an identity of a sender of the incoming communication and an identity of the recipient of the incoming communication, and
   predicting the one or more candidate response messages is further based on the identity of the sender and the identity of the recipient.

3. The method of claim 1, wherein:
   the request for the suggested response to the incoming communication includes a communication type of the incoming communication, and
   predicting the one or more candidate response messages is further based on the communication type of the incoming communication.

4. The method of claim 1, wherein:
   the request for the suggested response to the incoming communication includes a device type of the computing device, and
   predicting the one or more candidate response messages is further based on the device type of the computing device.

5. The method of claim 1, further comprising:
   normalizing, by the computing system, each message from the plurality of message and response pairs;
   aggregating, by the computing system and based on the normalized messages, the plurality of message and response pairs into one or more aggregated message and response pairs; and
   determining, by the computing system, a number of instances of each response for respective normalized messages from the aggregated message and response pairs,
   wherein classifying each response from the plurality of message and response pairs comprises classifying, by the computing system, each response from the one or more aggregated message and response pairs as having the information type.

6. The method of claim 5, further comprising:
   aggregating, by the computing system and based on a respective information type for each response from the one or more aggregated message and response pairs, the one or more aggregated message and response pairs into one or more consolidated message and response pairs; and
   determining, by the computing system and based on the number of instances of each response, a respective consolidated number of instances of the respective information type for each of the one or more consolidated message and response pairs,
   wherein storing the indication of each unique message from the plurality of message and response pairs includes storing, by the computing system, a respective indication of each of the one or more consolidated message and response pairs, a respective information type, and a respective consolidated number of instances of the respective information type.

7. A computing system, comprising:
at least one communication unit configured to receive a plurality of message histories, wherein each message history from the plurality of message histories includes one or more of a simple messaging service message history, multimedia messaging service message history, an instant messaging message history, or an email message history;
a storage device that stores instructions; and
at least one processor that executes the instructions to:
determine, based on the plurality of message histories, a plurality of message and response pairs;
determine a number of instances of each response for each message from the plurality of message and response pairs;
classify each response from the plurality of message and response pairs as having an information type, wherein the information type is one or more of time type, text type, number type, address type, emoji type, celebrity type, store type, day of week type, date type, or unknown type;
store, at the storage device, an indication of each unique message from the plurality of message and response pairs, an indication of the information type associated with the respective response associated with the unique message, and a number of responses from the plurality of message and response pairs having the information type as message and response information;
receive, via the at least one communication unit and from a computing device, a request for a suggested response to an incoming communication, the request including an indication of the incoming communication;
determine, based on the request and the message and response information stored at the storage device, a type of information expected to be included in a response to the incoming communication, wherein the type of information is one or more of the time type, the text type, the number type, the address type, the emoji type, the celebrity type, the store type, the day of week type, the date type, or the unknown type;
predict, based on the request and the type of information, one or more candidate response messages; and
send, via the at least one communication unit and to the computing device, an indication of the one or more candidate response messages.

8. The computing system of claim 7, wherein:
the request for the suggested response to the incoming communication includes an identity of a sender of the incoming communication and an identity of the recipient of the incoming communication, and
the one or more candidate response messages are further predicted based on the identity of the sender and the identity of the recipient.

9. The computing system of claim 7, wherein:
the request for the suggested response to the incoming communication includes a communication type of the incoming communication, and
the one or more candidate response messages are further predicted based on the communication type of the incoming communication.

10. The computing system of claim 7, wherein:
the request for the suggested response to the incoming communication includes a device type of the computing device, and
the one or more candidate response messages are further predicted based on the device type of the computing device.

11. The computing system of claim 7, wherein the at least one module is further operable by the at least one processor to:
normalize each message from the plurality of message and response pairs;
aggregate, based on the normalized messages, the plurality of message and response pairs into one or more aggregated message and response pairs;
determine a number of instances of each response for respective normalized messages from the aggregated message and response pairs; and
classify each response from the plurality of message and response pairs by at least classifying each response from the one or more aggregated message and response pairs as having the information type.

12. The computing system of claim 11, wherein the at least one module is further operable by the at least one processor to:
aggregate, based on a respective information type for each response from the one or more aggregated message and response pairs, the one or more aggregated message and response pairs into one or more consolidated message and response pairs;
determine, based on the number of instances of each response, a respective consolidated number of instances of the respective information type for each of the one or more consolidated message and response pairs; and
store the indication of each unique message from the plurality of message and response pairs by at least storing a respective indication of each of the one or more consolidated message and response pairs, a respective information type, and a respective consolidated number of instances of the respective information type.

13. A non-transitory computer-readable storage medium encoded with instructions that, when executed, cause at least one processor of a computing system to:
receive a plurality of message histories, wherein each message history from the plurality of message histories includes one or more of a simple messaging service message history, multimedia messaging service message history, an instant messaging message history, or an email message history;
determine, based on the plurality of message histories, a plurality of message and response pairs;
determine a number of instances of each response for each message from the plurality of message and response pairs;
classify each response from the plurality of message and response pairs as having an information type, wherein the information type is one or more of time type, text type, number type, address type, emoji type, celebrity type, store type, day of week type, date type, or unknown type;
store an indication of each unique message from the plurality of message and response pairs, an indication of the information type associated with the respective response associated with the unique message, and a number of responses from the plurality of message and response pairs having the information type as message and response information;

receive, from a computing device, a request for a suggested response to an incoming communication, the request including an indication of the incoming communication;

determine, based on the request and the message and response information, a type of information expected to be included in a response to the incoming communication, wherein the type of information is one or more of the time type, the text type, the number type, the address type, the emoji type, the celebrity type, the store type, the day of week type, the date type, or the unknown type;

predict, based on the request and the type of information, one or more candidate response messages; and send, to the computing device, an indication of the one or more candidate response messages.

14. The non-transitory computer-readable storage medium of claim 13, wherein:
the request for the suggested response to the incoming communication includes an identity of a sender of the incoming communication and an identity of the recipient of the incoming communication, and
the one or more candidate response messages are predicted based on the identity of the sender and the identity of the recipient.

15. The non-transitory computer-readable storage medium of claim 13, wherein:
the request for the suggested response to the incoming communication includes a communication type of the incoming communication, and
the one or more candidate response messages are predicted based on the communication type of the incoming communication.

16. The non-transitory computer-readable storage medium of claim 13, wherein the instructions further cause the one or more processors to:
normalize each message from the plurality of message and response pairs;
aggregate, based on the normalized messages, the plurality of message and response pairs into one or more aggregated message and response pairs;
determine a number of instances of each response for respective normalized messages from the aggregated message and response pairs; and
classify each response from the plurality of message and response pairs by at least classifying each response from the one or more aggregated message and response pairs as having the information type.

17. The non-transitory computer-readable storage medium of claim 16, wherein the instructions further cause the one or more processors to:
aggregate, based on a respective information type for each response from the one or more aggregated message and response pairs, the one or more aggregated message and response pairs into one or more consolidated message and response pairs;
determine, based on the number of instances of each response, a respective consolidated number of instances of the respective information type for each of the one or more consolidated message and response pairs; and
store the indication of each unique message from the plurality of message and response pairs by at least storing a respective indication of each of the one or more consolidated message and response pairs, a respective information type, and a respective consolidated number of instances of the respective information type.

* * * * *